United States Patent
Sugimoto

(10) Patent No.: US 7,316,445 B2
(45) Date of Patent: Jan. 8, 2008

(54) ATTACHMENT STRUCTURE FOR TONNEAU COVER FOR PICKUP TRUCK

(75) Inventor: Ryuji Sugimoto, Niiza (JP)

(73) Assignee: Honda Access Corporation, Saitama (JP)

(*) Notice: Subject to any disclaimer, the term of this patent is extended or adjusted under 35 U.S.C. 154(b) by 179 days.

(21) Appl. No.: 11/197,438

(22) Filed: Aug. 5, 2005

(65) Prior Publication Data

US 2006/0049658 A1 Mar. 9, 2006

(30) Foreign Application Priority Data

Sep. 6, 2004 (JP) ............... 2004-258325

(51) Int. Cl.
 B60P 7/02 (2006.01)
 B60R 13/07 (2006.01)
 B62D 25/07 (2006.01)
(52) U.S. Cl. ............... 296/100.03; 296/136.03; 296/213
(58) Field of Classification Search ............... 296/39.2, 296/100.01, 100.03, 100.06, 100.17, 136.06, 296/208, 213
See application file for complete search history.

(56) References Cited

U.S. PATENT DOCUMENTS

| | | | | | |
|---|---|---|---|---|---|
| 1,718,183 | A | * | 6/1929 | Smith | 160/368.1 |
| 2,122,712 | A | * | 7/1938 | Bishop | 296/220.01 |
| D235,327 | S | * | 6/1975 | Morris | D12/404 |
| 3,977,720 | A | * | 8/1976 | Schreiberg | 296/185.1 |
| 4,394,100 | A | * | 7/1983 | Sperlich | 410/2 |
| 4,611,848 | A | * | 9/1986 | Romano | 296/98 |
| 4,733,898 | A | * | 3/1988 | Williams | 296/24.32 |
| 4,776,629 | A | * | 10/1988 | Cross | 296/100.03 |
| 4,807,921 | A | * | 2/1989 | Champie et al. | 296/98 |
| 4,900,080 | A | * | 2/1990 | Morris, II | 296/100.06 |
| 5,137,322 | A | * | 8/1992 | Muirhead | 296/39.2 |
| D333,289 | S | * | 2/1993 | Shirlin et al. | D12/403 |
| 5,183,309 | A | * | 2/1993 | Jordan | 296/100.07 |
| 5,584,521 | A | * | 12/1996 | Hathaway et al. | 296/36 |
| 5,971,469 | A | * | 10/1999 | Lund et al. | 296/100.01 |
| 6,053,558 | A | * | 4/2000 | Weldy et al. | 296/100.17 |
| 6,126,226 | A | * | 10/2000 | Wheatley | 296/100.17 |
| 6,176,541 | B1 | * | 1/2001 | Hoff | 296/100.09 |

(Continued)

FOREIGN PATENT DOCUMENTS

JP        60045481 A  *  3/1985   ................. 296/154

(Continued)

OTHER PUBLICATIONS

Canadian Office Action dated Feb. 7, 2007, Application No. 2,517,787.

Primary Examiner—D. Glenn Dayoan
Assistant Examiner—Paul Chenevert
(74) Attorney, Agent, or Firm—Westerman, Hattori, Daniels & Adrian, LLP.

(57) ABSTRACT

An attachment structure for a tonneau cover, formed in an approximately tabular shape, for a pickup truck with a bed extending from a rear end of a vehicle to a rear pillar portion, comprises a bed rail as an elongated support member on which the tonneau cover for the pickup truck is placed, the tonneau cover extending on an inner surface of a side wall of the pickup truck in the longitudinal direction of the pickup truck in such a way that the upper surface of the tonneau cover is put apart downward from the upper end of the bed of the pickup truck.

8 Claims, 7 Drawing Sheets

U.S. PATENT DOCUMENTS

| | | | |
|---|---|---|---|
| 6,186,575 B1 * | 2/2001 | Fisher et al. | 296/100.03 |
| 6,276,735 B1 * | 8/2001 | Champion | 296/37.6 |
| 6,302,465 B1 * | 10/2001 | Faber et al. | 296/39.1 |
| 6,471,277 B1 * | 10/2002 | Scensny et al. | 296/37.6 |
| 6,478,355 B1 * | 11/2002 | Van Eden et al. | 296/37.6 |
| 6,582,012 B1 * | 6/2003 | Smith | 296/208 |
| 6,598,930 B1 * | 7/2003 | Tilton | 296/100.06 |
| 6,629,714 B2 * | 10/2003 | Campbell | 296/37.6 |
| 6,641,201 B1 * | 11/2003 | Pietryga et al. | 296/100.1 |
| 6,908,139 B1 * | 6/2005 | Szieff | 296/100.03 |
| 7,014,400 B1 * | 3/2006 | LaBelle et al. | 410/104 |
| 2003/0193209 A1 * | 10/2003 | Melvani | 296/100.02 |
| 2004/0164585 A1 * | 8/2004 | Wheatley | 296/100.17 |

FOREIGN PATENT DOCUMENTS

| | | | |
|---|---|---|---|
| JP | 64-56281 | 3/1989 | |
| JP | 04266526 A * | 9/1992 | 296/213 |

\* cited by examiner (a)

(b)

(a)

(b)

ATTACHMENT STRUCTURE FOR TONNEAU COVER FOR PICKUP TRUCK

BACKGROUND OF THE INVENTION

1. Field of the Invention

The present invention relates to an attachment structure for a tonneau cover, formed in an approximately tabular shape, for a pickup truck with a bed extending from a rear end of a vehicle to a rear pillar portion.

2. Description of the Related Art

Japanese Unexamined Patent Publication No. 64-56281 discloses a conventional cover for a bed of a pickup truck with side walls, a front end and a rear end. The cover comprises a plurality of cover panels, a rear cover panel which extends across the side walls for covering the truck bed area adjacent to the rear end of the truck bed, and a second cover panel for covering the area of the rear end. The rear panel has a forwardly projecting channel-shaped hinge portion. A rearwardly projecting hinge portion of the second panel and the forwardly projecting hinge portion of the rear panel are so interlocked as to provide the hinged connection between those panels. A lock mechanism for each panel to detachably and selectively lock the cover panels to the side walls of the truck bed is provided. Accordingly, when one of the cover panels is fixed to a predetermined position over the bed of the truck, the other panels can pivot around the hinged connection and be opened to expose the bed area of the truck below the other covers.

In the above-described technology, however, as the cover for the bed of the pickup truck is fixed to the upper end of the bed of the pickup truck, if the rear pillar leans frontward and obliquely, a part of the bed along the right-left direction corresponding to a location where the rear pillar leans frontward and obliquely, can not be covered.

The present invention has been made in viewing the above-described circumstance. It is an object of the present invention to provide an attachment structure for a tonneau cover for a pickup truck which can cover the bed of the pickup truck even if the rear pillar of the pickup truck leans frontward and obliquely.

SUMMARY OF THE INVENTION

To achieve the above object, according to the first aspect of the invention, there is provided an attachment structure for a tonneau cover, formed in an approximately tabular shape, for a pickup truck with a bed extending from a rear end of a vehicle to a rear pillar portion, which comprises an elongated support member on which the tonneau cover for the pickup truck is placed, the tonneau cover extending on an inner surface of a side wall of the pickup truck in a longitudinal direction of the pickup truck in such a way that an upper surface of the tonneau cover is put apart downward from an upper end of the bed of the pickup truck.

According to the attachment structure for a tonneau cover of the first aspect, the elongated support member on which the tonneau cover for the pickup truck is placed, the tonneau cover extending on the inner surface of the side wall of the pickup truck in the longitudinal direction of the pickup truck in such a way that the upper surface of the tonneau cover is put apart downward from the upper end of the bed of the pickup truck. Therefore, the bed of the pickup truck can be covered even if the rear pillar of the pickup truck leans frontward and obliquely.

In the attachment structure for a tonneau cover, an outlet for ejecting a liquid, which flows over an upper surface of the support member, may be provided in that spot of the side wall of the bed of the pickup truck which approximately overlaps the upper surface of the support member in an vertical direction of the pickup truck.

In the attachment structure for a tonneau cover, a groove through which the liquid flows may be formed in said upper surface of said support member.

That part of the upper surface of the support member which is close to the outlet may be provided with a guide body which guides the liquid to the outlet.

A mount structure on which an equipment for the pickup truck can be mounted may be formed in the support member.

BRIEF DESCRIPTION OF THE DRAWINGS

The object, other objects, and advantages of the invention will be more apparent upon reading of the following detailed description together with the accompanying drawings in which.

DETAILED DESCRIPTION OF THE PREFERRED EMBODIMENT

A preferred embodiment of an attachment structure for a tonneau cover for a pickup truck according to the invention will now be explained with reference to the accompanying drawings. FIGS. 1 to 7 are diagrams explaining one embodiment of the attachment structure for the tonneau cover for a pickup truck according to the invention.

Figure 1:
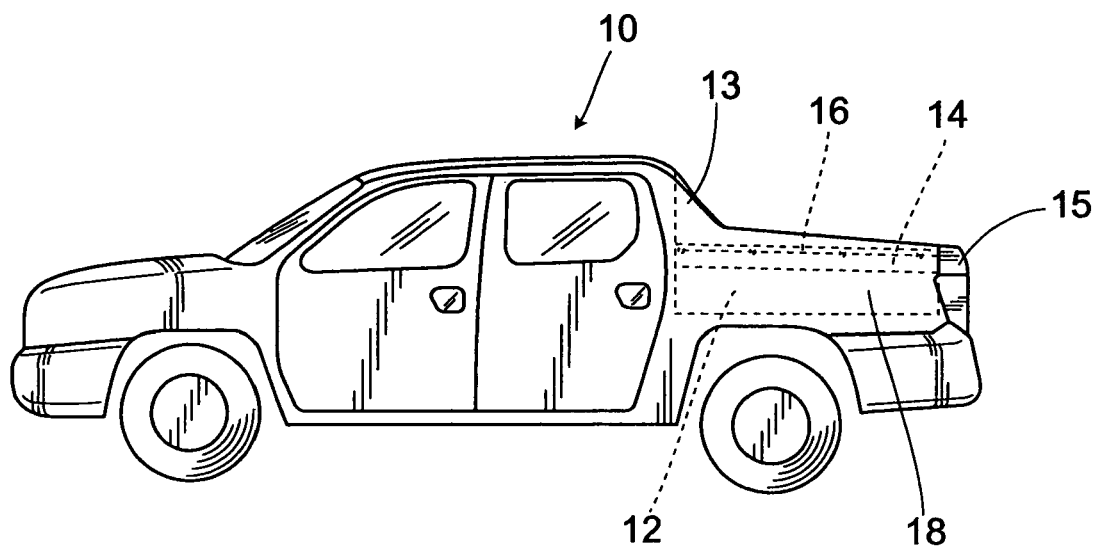
FIG. 1 is a side view of a pickup truck according to the invention.
Figure 2:
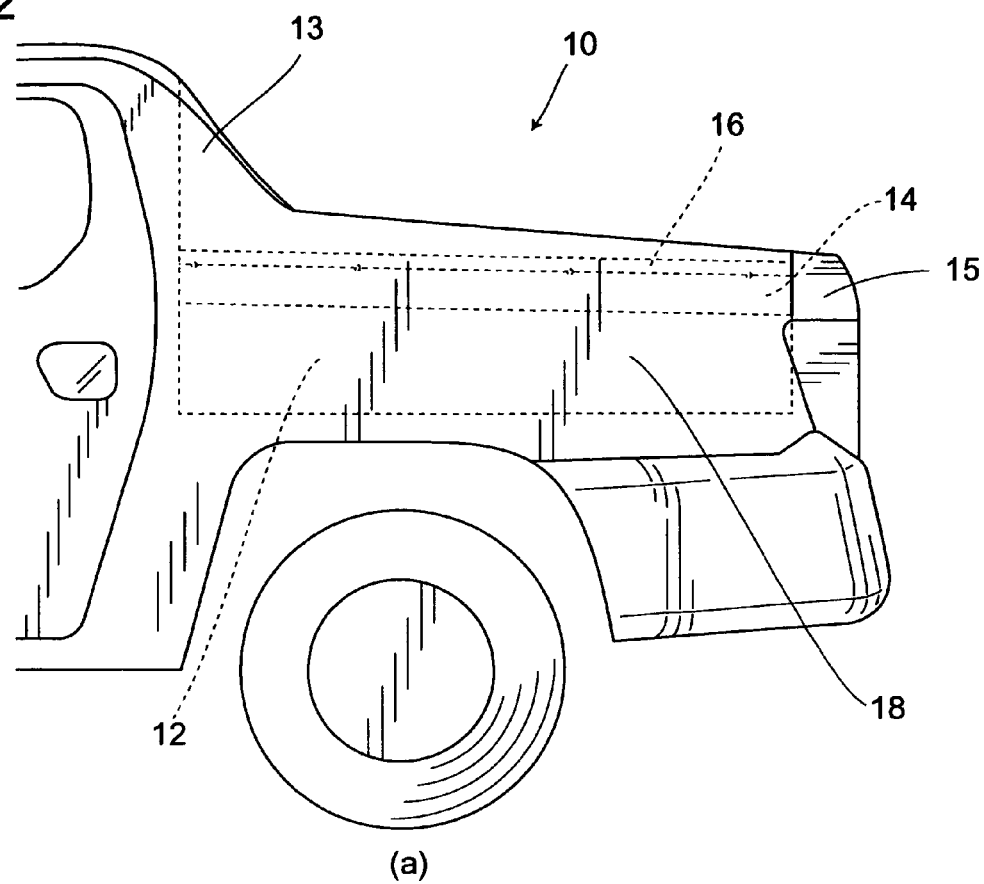
FIG. 2A is an enlarged side view of the pickup truck according to the invention.
FIG. 2B is an enlarged plan view illustrating the rear of the pickup truck according to the invention.
Figure 2:
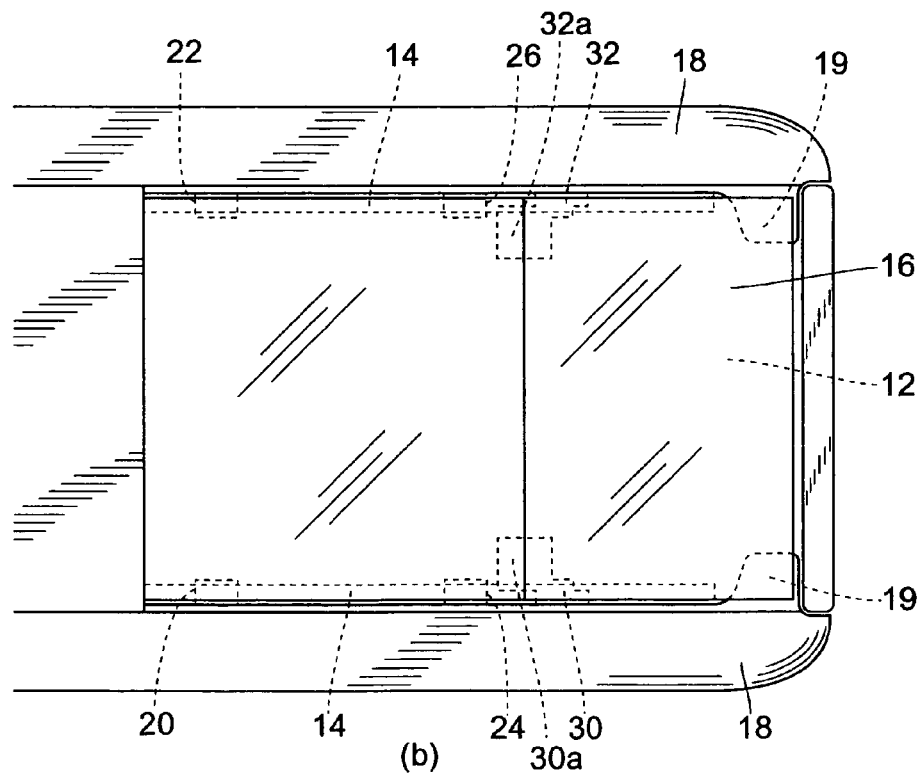

FIG. 1 is a side view of a pickup truck 10. The rear of the pickup truck 10 is provided with a bed 12. The bed 12 is so provided as to extend backward from a portion of a rear pillar 13 of the pickup truck 10 to a tail gate 15 as the rear end of the pickup truck 10. An elongated support member 14 is so provided on the inner surfaces of the right and left side walls of the bed 12 as to be put apart from the upper end of the bed 12. A tonneau cover 16 which covers the bed 12 is placed on the upper surface of the support member 14. The exterior of the bed 12 is surrounded by an outside panel 18.

Figure 3:
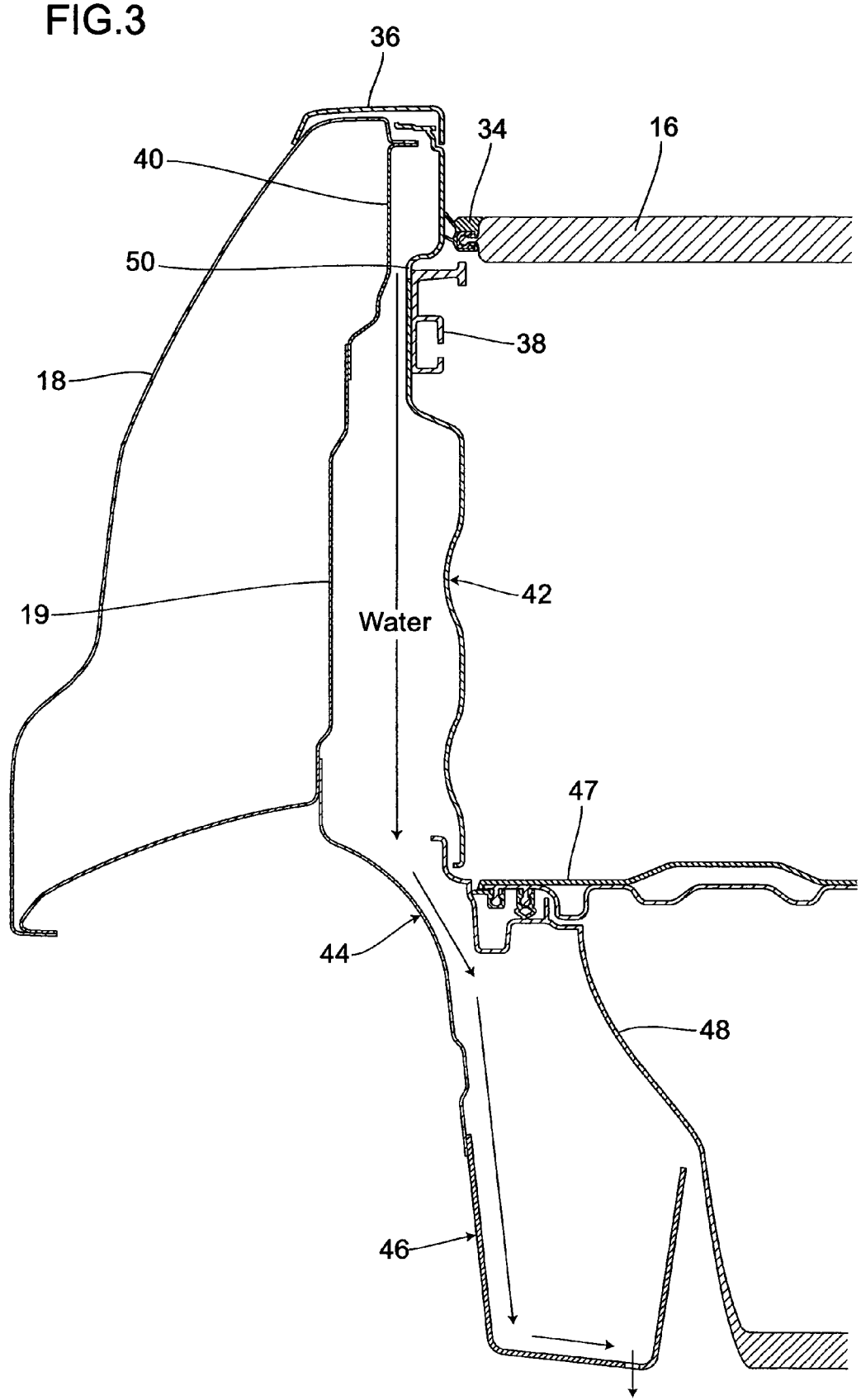
FIG. 3 is a longitudinal sectional view at the rear of the pickup truck according to the invention.
Figure 4:
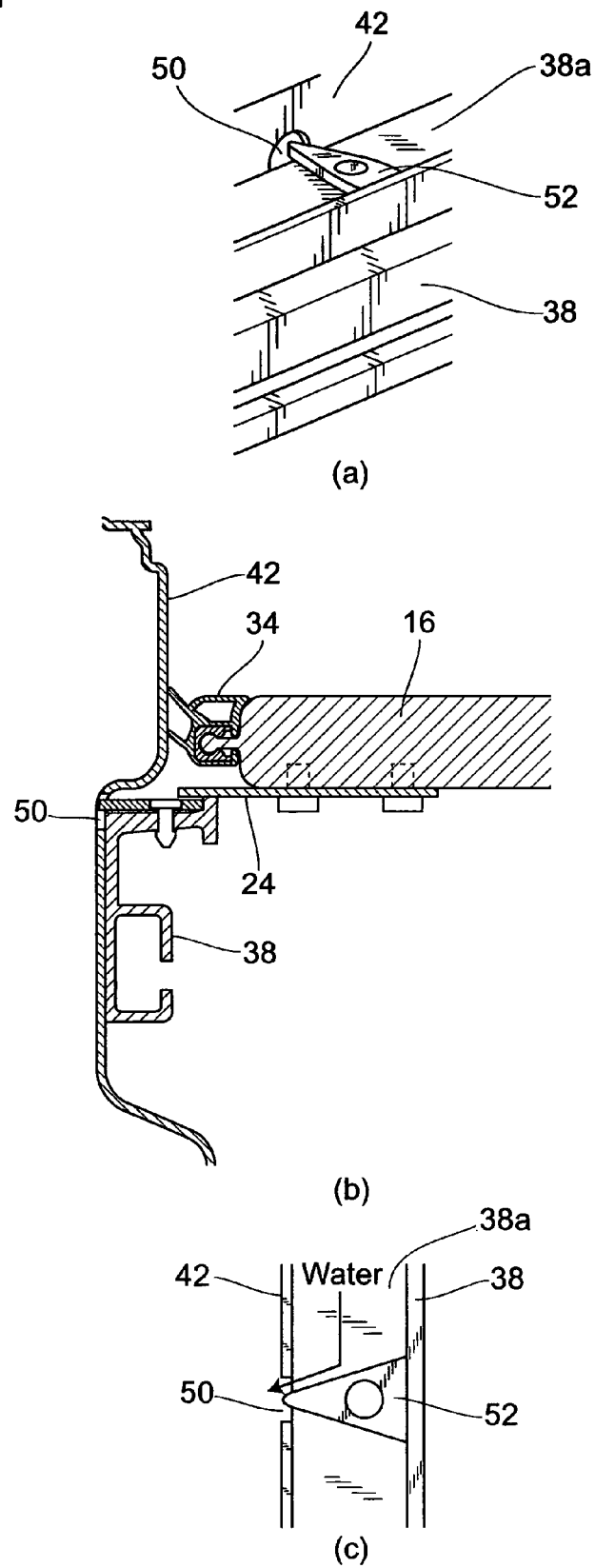
FIG. 4A is a perspective view illustrating the neighborhood of an outlet provided in a bed of the pickup truck according to the invention.
FIG. 4B is a longitudinal sectional view illustrating the details of the neighborhood of the outlet provided in the bed of the pickup truck according to the invention.
FIG. 4C is a top view illustrating the details of the neighborhood of the outlet provided in the bed of the pickup truck according to the invention.

FIGS. 2A and 2B are diagrams illustrating the rear of the pickup truck 10. FIG. 2A is an enlarged side view of the pickup truck 10, and FIG. 2B is an enlarged plan view illustrating the rear of the pickup truck 10. As same as FIG. 1, the rear of the pickup truck 10 is provided with the bed 12. The bed 12 is so provided as to extend backward from that portion of the rear pillar 13 of the pickup truck 10 to the tail gate 15 as the rear end of the pickup truck 10. The elongated support member 14 is so provided on the inner surfaces of the right and left side walls of the bed 12 as to be put apart from the upper end of the bed 12. The tonneau cover 16 which covers the bed 12 is placed on the upper surface of the support member 14. The tonneau cover 16 is formed in an approximately tabular shape. The exterior of the bed 12 of the pickup truck 10 is surrounded by the outside panel 18. The tonneau cover 16 is mounted on the support member 14 and rear-end-right-and-left protrusions 19 of rear inside panels constituting the side walls of the bed 12, by means of a bracket 20 provided on the front of the left end of the tonneau cover 16, a bracket 22 provided on the front of the right end of the tonneau cover 16, a bracket 26 provided on the center of the right end of the tonneau cover 16, a bracket 24 provided on the center of the left end of the tonneau cover 16, a bracket 32 provided on the rear of the bracket 26 on the center of the right end of the tonneau cover 16, and a bracket 30 provided on the rear of the bracket 24 on the center of the left end of the tonneau cover 16. The tonneau cover 16 can be bent upward by a hinge 32a integrally provided on the bracket 32 on the center of the right end of the tonneau cover 16, and a hinge 30a integrally provided on the bracket 30 on the center of the left end of the tonneau cover 16. FIG. 3 is a longitudinal sectional view at the rear of the pickup truck 10. The upper end of the side wall of the bed 12 of the pickup truck 10 is provided with a bed rail garnish 36. The inner surface of the side wall of the bed 12 is provided with a side lining 42. The tonneau cover 16 is approximately horizontally provided in such a manner as to be put apart downward from the upper surface of the bed rail garnish 36. The right and left ends of the tonneau cover 16 are provided with side seals 34. The inner surface of the side lining 42 is provided with a bed rail 38, downward of the tonneau cover 16. At the upper end of the side lining 42 in the exterior thereof, a rear inside rail 40 is provided, and the rear inside panel 19 is provided downward of the rear inside rail 40 in a continuous fashion with respect to the rear inside rail 40. The outside panel 18 is provided at the exteriors of the side lining 42 and the rear inside panel 19. A rear wheel house 44 of an arcuate shape hollowing inward, which is continuous to the section of downward approximately straight line in the rear inside rail 40, is provided downward of the rear inside rail 40. A rear frame 46 formed in an approximately letter -U shape which opens its upper portion is provided downward of the rear wheel house 44. The bottom portion of the bed 12 is provided with a trunk lid 47. A trunk 48 is provided downward of the trunk lid 47. A portion of the side lining 42 downward of the tonneau cover 16 and between the bed rail 38 and the tonneau cover 16 is provided with an outlet 50 for ejecting a liquid.

According to the above-described structure, even if the liquid such as a rain which falls to the upper surface of the tonneau cover 16, passes through the side seal 34, the liquid can be received by the bed rail 38, and ejected through the outlet 50 formed on the side lining 42. The liquid such as a rain flows between the side lining 42, the trunk 48, and, the rear inside panel 19, the rear wheel house 44, the rear frame 46, and is ejected from the lower wall of the rear frame 46 to the outside of the pickup truck 10.

Next, a description will be given of the neighborhood of the outlet 50 provided in the side lining 42. FIG. 4A is a perspective view illustrating the neighborhood of the outlet 50 provided in the bed 12 of the pickup truck 10. FIG. 4B is a longitudinal sectional view illustrating the details of the neighborhood of the outlet 50 provided in the bed 12 of the pickup truck 10. FIG. 4C is a top view illustrating the details of the neighborhood of the outlet 50 provided in the bed 12 of the pickup truck 10. A groove 38a with one side surface constituted by the inner wall of the bed rail 38 is formed in upper surface of the bed rail 38, and the other side surface constituted by the side lining 42. A guide body 52 is provided on the upper surface of the bed rail 38 adjacent to the outlet 50 provided in the side lining 42. The guide body 52 is so formed in an approximately triangular shape, in viewing from the above, as to guide the liquid flowing through the groove 38 to the outlet 50 from both front and rear. The side seals 34 are so provided on both ends of the tonneau cover as to contact the side linings 42. The brackets 24, 26, etc, for mounting the tonneau cover 16 on the bed rail 38 are fixed to the bottom surfaces of both ends of the tonneau cover 16. The guide body 52 is fixed to the upper surface of the bed rail 38.

According to the above-described embodiment, the liquid such as a rain which falls to the upper surface of the tonneau cover 16 is allowed to flow through the groove 38a of the bed rail 38, and guided to the outlet 50 by the guide body 52.

Figure 5:
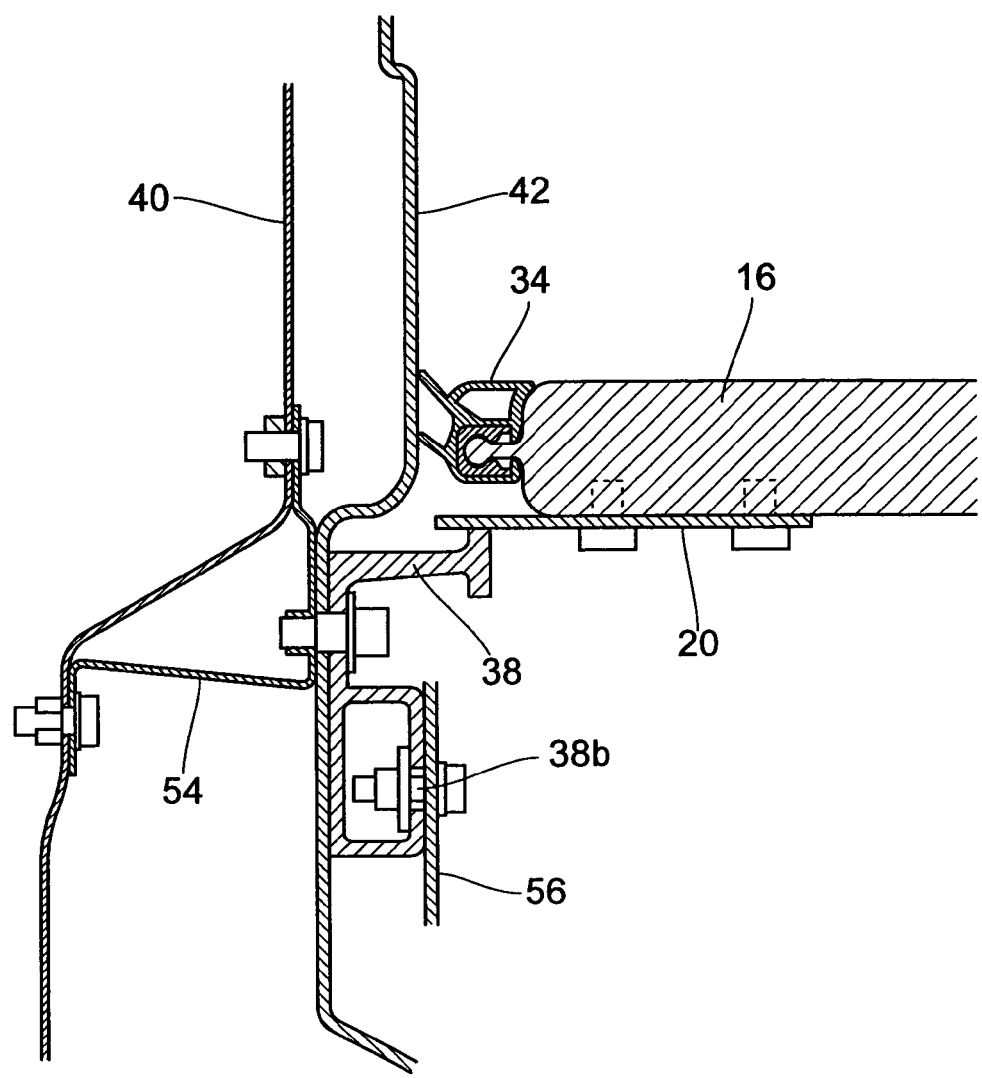
FIG. 5 is a diagram illustrating the structure which attaches an equipment for the pickup truck to the bed rail, provided on the bed of the pickup truck according to the invention.
Figure 6:
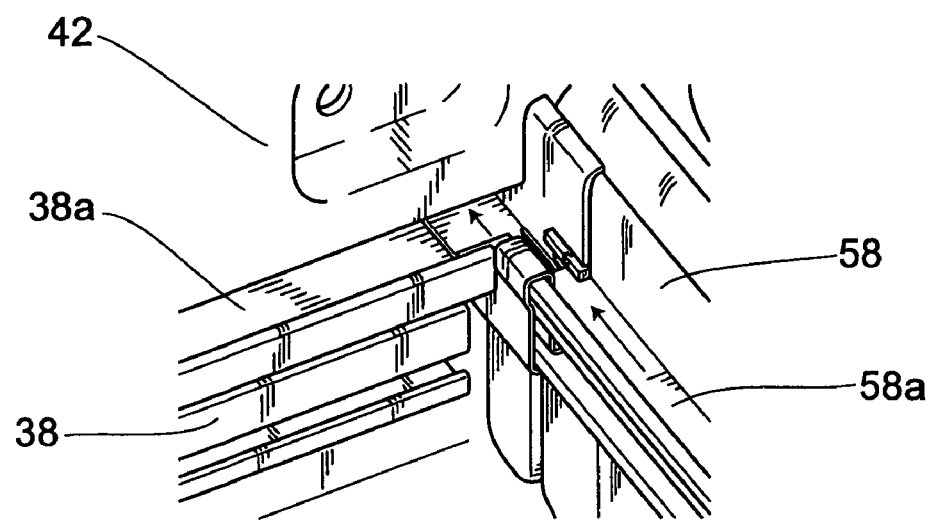
FIG. 6A is a perspective view illustrating the front end and the side wall portion of the bed with a tonneau cover removed according to the invention.
FIG. 6B is a longitudinal sectional view of the front end of the bed according to the invention.
Figure 6:
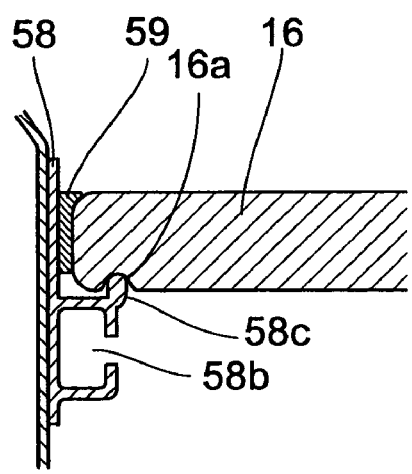

Next, a description will be given of a structure which attaches an equipment for the pickup truck 10 to the bed rail 38. FIG. 5 is a diagram illustrating the structure which attaches an equipment 56 for the pickup truck 10 to the bed rail 38. The bed rail 38 has an upper surface portion extending in the right and left direction, and the inner tip of the bed rail 38 extends in the vertical direction. The outer surface portion of the bed rail 38 extends downward from the upper surface portion. The lower portion of the bed rail 38 is formed in an approximately rectangular longitudinal sectional shape in such a manner as to have space 38b thereinside. The equipment 56 for the pickup truck 10 is fixed to the bed rail 38 by a joining member like a bolt and a nut, using the space 38b. The bed rail 38 is fixed to a bracket 54 which joins the rear inside rail 40 and the side lining 42.

Next, a description will be given of the front end of the bed 12 of the pickup truck 10. FIGS. 6A and 6B are diagrams illustrating the front end of the bed 12 of the pickup truck 10. FIG. 6A is a perspective view illustrating the front end and the side wall portion of the bed 12 with the tonneau cover 16 removed. FIG. 6B is a longitudinal sectional view of the front end of the bed 12. A head board rail 58 is provided on the front end of the bed 12. The head board rail 58 extends along the right-left direction of the bed 12. A bump portion with a groove 58a extending along the right-left direction is formed in the head board rail 58. The groove 58a of the head board rail 58 is formed in such a way that its location in the vertical direction is nearly aligned with the groove 38a of the bed rail 38. The head board rail 58 has the front wall formed in a rectangular plate shape. The bottom portion of the head board rail 58 is so formed as to have space 58b on the inner surface portion of the head board rail 58 with an internal space and a longitudinal plane formed in an approximately rectangular shape. The inner tip portion 58c of the bump portion of the head board rail 58 extends upward, and the tip portion 58c is formed in an arcuate shape. When the tonneau cover 16 is mounted on the head board rail 58, the tip portion 58c, extending upward from the inner tip portion of the bump portion of the head board rail 58, fits into an arcuate recess portion 16a formed on the front end of the tonneau cover 16 and extending in the right-left direction. The tonneau cover 16 contacts the head board rail 58 via a front seal 59.

Figure 7:
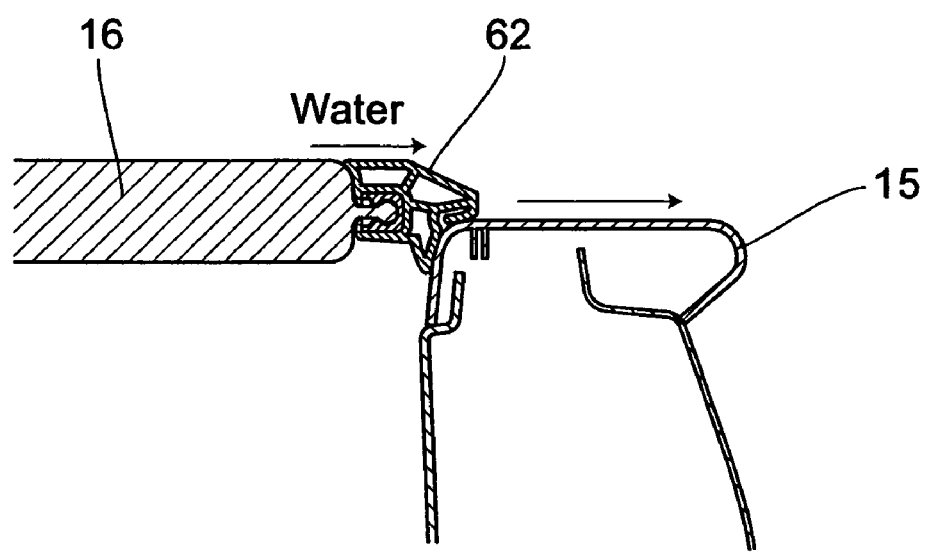
FIG. 7 is a diagram illustrating the rear end of the pickup truck according to the invention.

FIG. 7 is a diagram illustrating the rear end of the pickup truck 10. The tail gate 15 as the rear end of the bed 12 contacts the rear end of the tonneau cover 16 via a tail seal 62.

As explained above, according to the embodiment, the bed rail 38 as the elongated support member on which the tonneau cover 16 for the pickup truck 10 is placed, the tonneau cover 16 extending on the inner surface of the side wall of the pickup truck 10 in the longitudinal direction of the pickup truck 10 in such a way that the upper surface of the tonneau cover 16 is put apart downward from the upper end of the bed of the pickup truck. Therefore, the bed 12 of the pickup truck 10 can be covered even if the rear pillar 13 of the pickup truck 10 leans frontward and obliquely.

According to the embodiment, the outlet 50 for ejecting a liquid, which flows over the upper surface of the bed rail 38 as the support member, is provided in that spot of the side wall of the bed 12 of the pickup truck 10 which approximately overlaps the upper surface of the bed rail 38 as the support member in the vertical direction of the pickup truck 10. Therefore, when the liquid like a rain flows to the side wall of the bed 12 of the pickup truck 10 from the tonneau cover 16 for the pickup truck, the flowing of the liquid like a rain into the bed 12 of the pickup truck 10 can be prevented.

According to the embodiment, as the groove 38a through which the liquid flows is formed in the upper surface of the bed rail 38 as the support member, the liquid like a rain flows over the upper surface of the bed rail 38 from the tonneau cover 16 for the pickup truck 10, and is ejected from the outlet.

According to the embodiment, as that part of the upper surface of the bed rail 38 as the support member which is close to the outlet 50 is provided with the guide body 52 which guides the liquid to the outlet 50, the liquid like a rain can be easily guided to the outlet 50.

According to the embodiment, the bed rail 38 as the mount structure on which the equipment 56 for the pickup truck 10 can be mounted is formed in the support member. Therefore, the equipment 56 for the pickup truck 10 is attached to the bed rail 38 as the support member, thereby being placed on the bed 12 of the pickup truck 10, etc.

The invention is not limited to the above-described embodiment, and various modified embodiments can be carried out within the scope of the present invention.

What is claimed is:

1. An attachment structure for a tonneau cover, having a substantially tabular shape, for a pickup truck with a bed, wherein the tonneau extends from a rear end of the pickup truck to a rear pillar portion thereof, said attachment structure comprises:
    an elongated support member extending along opposing sidewalls of the pickup truck bed, for supporting the tonneau cover such that an upper surface of the tonneau cover is below an upper end of the pickup truck bed, wherein the tonneau cover extends along, in contact with, an inner surface of the sidewalls of the pickup truck bed,
    wherein said support member has an upper surface for guiding a liquid therealong, and said sidewall includes an opening at the same level, and in communication with, said upper surface for draining liquid through said sidewall.

2. The attachment structure for a tonneau cover according to claim 1, wherein said support member includes a mounting structure for securing equipment in the pickup truck bed.

3. The attachment structure for a tonneau cover according to claim 1, wherein a part of said upper surface of said support member, which is close to said opening, has a guide body which guides the liquid to said outlet.

4. The attachment structure for a tonneau cover according to claim 3, wherein said support member includes a mounting structure for securing equipment in the pickup truck bed.

5. The attachment structure for a tonneau cover according to claim 1, wherein a groove through which the liquid flows is formed in said upper surface of said support member.

6. The attachment structure for a tonneau cover according to claim 5, wherein said support member includes a mounting structure for securing equipment in the pickup truck bed.

7. The attachment structure for a tonneau cover according to claim 5, wherein a part of said upper surface of said support member, which is close to said opening, has a guide body which guides the liquid to said outlet.

8. The attachment structure for a tonneau cover according to claim 7, wherein said support member includes a mounting structure for securing equipment in the pickup truck bed.

* * * * *